(12) United States Patent
Lyon et al.

(10) Patent No.: US 11,626,661 B2
(45) Date of Patent: Apr. 11, 2023

(54) VEHICLE HAVING ANTENNA POSITIONER ADJUSTED FOR TIMING LATENCY AND ASSOCIATED METHODS

(71) Applicant: L3HARRIS TECHNOLOGIES, INC., Melbourne, FL (US)

(72) Inventors: Scott M. Lyon, South Weber, UT (US); Brent R. Mellor, Jr., Salt Lake City, UT (US); Brian H. Rosenlof, Eagle Mountain, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/348,820

(22) Filed: Jun. 16, 2021

(65) Prior Publication Data

US 2022/0407223 A1    Dec. 22, 2022

(51) Int. Cl.
*H01Q 3/08* (2006.01)
*G01C 21/16* (2006.01)
*G01C 23/00* (2006.01)

(52) U.S. Cl.
CPC .............. *H01Q 3/08* (2013.01); *G01C 21/16* (2013.01); *G01C 23/00* (2013.01)

(58) Field of Classification Search
CPC ........... H01Q 3/08; H01Q 1/125; G01C 21/16
See application file for complete search history.

(56) References Cited

U.S. PATENT DOCUMENTS

| | | | | |
|---|---|---|---|---|
| 6,417,802 | B1* | 7/2002 | Diesel ............... | G01S 19/26 342/357.31 |
| 8,730,115 | B2* | 5/2014 | Yeshanov ............. | H01Q 3/00 343/760 |
| 2008/0150798 | A1 | 6/2008 | Curry et al. | |
| 2009/0030608 | A1* | 1/2009 | Soehren .............. | G01C 21/165 701/510 |
| 2017/0254877 | A1* | 9/2017 | Yoon ................... | G01S 5/06 |
| 2018/0233819 | A1* | 8/2018 | Royalty ............... | H01Q 3/32 |
| 2019/0123440 | A1* | 4/2019 | Henneberry ......... | H01Q 3/08 |
| 2022/0196852 | A1* | 6/2022 | Reimer ................ | G01S 5/017 |

FOREIGN PATENT DOCUMENTS

| | | | | | |
|---|---|---|---|---|---|
| CN | 105893687 | A | * | 8/2016 | ........... G01C 25/005 |
| CN | 110837854 | B | * | 2/2022 | ........... G06K 9/6288 |
| JP | 2008076389 | A | * | 4/2008 | ........... G01C 21/165 |
| JP | 2011220791 | A | * | 11/2011 | |
| WO | WO-2021096812 | A1 | * | 5/2021 | ......... H04B 7/18508 |

OTHER PUBLICATIONS

Tom Bennett, The Difference Between IMU, AHRS, and INS, Mar. 2021, Inertial Sense (Year: 2021).*

* cited by examiner

*Primary Examiner* — Ab Salam Alkassim, Jr.
*Assistant Examiner* — Anh N Ho
(74) *Attorney, Agent, or Firm* — Allen, Dyer, Doppelt + Gilchrist, P.A.

(57) ABSTRACT

A vehicle includes a vehicle platform, an antenna, and an antenna positioner configured to position the antenna relative to the vehicle platform. An inertial navigation system (INS) is associated with the vehicle platform and configured to generate INS output data. An inertial measurement unit (IMU) is associated with the antenna positioner and configured to generate IMU output data having a timing latency difference relative to the INS output data. A controller may be configured to control the antenna positioner based upon the INS output data and the IMU output data adjusted for the timing latency therebetween.

29 Claims, 5 Drawing Sheets

VEHICLE HAVING ANTENNA POSITIONER ADJUSTED FOR TIMING LATENCY AND ASSOCIATED METHODS

FIELD OF THE INVENTION

The present invention relates to the field of antennas, and, more particularly, to an antenna positioning system for a vehicle antenna that adjusts for timing latency between Initial Navigation System (INS) output data and Inertial Measurement Unit (IMU) output data and related methods.

BACKGROUND OF THE INVENTION

Some mobile platforms, such as an aircraft, include an antenna on its fuselage or wing, and an antenna positioning system and associated antenna positioner that positions the antenna relative to the platform. The antenna positioning system may operate as a dedicated antenna reference unit with respect to other platform equipment that may be located on different locations of the platform. For example, the antenna positioner may include an antenna pedestal, gimbal, or other antenna mount, and an Inertial Measurement Unit (IMU), which may be mounted at the base of the antenna pedestal or gimbal, reflector, or mounted to other parts of an antenna positioner. The system may include computing hardware and software as part of a controller associated with the antenna and IMU, or as a separate unit. The controller computes the attitude, including the roll, pitch and yaw of the IMU location.

The IMU output data may include measured body rates such as acceleration rates, angular rotation rates, and similar data. An IMU usually includes one or more accelerometers and one or more gyroscopes, and may include a magnetometer, or barometer. The IMU generally supplies roll, pitch and yaw rates to the system in addition the acceleration in three dimensions. In the past, most IMU's were mechanical devices, but recently have been replaced by high-end fiber optic gyroscopes and ring laser systems, or more commonly by simple, low cost microelectromechanical systems (MEMS) based devices. MEMS based IMU's are less stable than other more expensive IMU systems, but have significantly lower costs and often are preferred in many antenna positioning systems where the IMU is associated with an antenna positioner. Some MEMS based IMU's have increased bias and output rotation rates, which hinder high accuracy antenna pointing.

The antenna positioning system may include a controller that is configured to control an antenna positioner based upon the IMU output data. In order to increase accuracy of the controller associated with the IMU and antenna positioner, output data from an Initial Navigation System (INS) is received at the controller. The INS is typically a high-end device of navigation grade category and usually positioned in the flight deck of the aircraft. The INS includes not only accelerometers, gyroscopes, and magnetometers, but it also includes other sensors, such as a Global Positioning Sensor (GPS) device, a barometric altimeter, a speed measuring device, and similar sensors that allow an INS to integrate data over a significant amount of time and obtain accurate flight and positioning data.

The INS permits the heading, attitude and position of the aircraft to be determined to high accuracy. The INS also includes computing hardware and software that allows the INS to output real-time three-dimensional velocities and three-dimensional angles, including the actual roll, pitch, yaw, and heading of the aircraft. In contrast, the IMU may output changes in velocity and changes in angular motion, but the INS outputs very accurate velocities of the aircraft with navigational grade positional angles and related data. For that reason, the controller that is associated with the IMU and the antenna positioner of the antenna positioning system, located on the wing of the aircraft, for example, usually receives INS output data to make a more accurate determination of how the azimuth and elevation of the antenna should be adjusted. However, with the high accuracy required with communications and a distant target like a satellite, or a remote aircraft or ship, it may be important that the IMU output data match and correlate in timing with the INS output data to improve the accuracy. This correlation between the INS and IMU is important, but often in error, because of the dynamics experienced at the antenna. For example, the cockpit of an airplane will move differently and have a different vibration profile than a location on the wing of an aircraft. With a large ship there will be a difference in the bending and vibration on the deck relative to the center of mass where the INS is typically located. Timing differences typically occur between the INS output data and IMU output data because of bending moments in the aircraft, signal latency, alignment differences, processing time, traveling through multiple processors and similar factors.

Sometimes the timing latency between the INS and IMU is determined manually while an antenna is mounted on a motion table to adjust the average time difference between the IMU and INS. When using a motion table in a test facility, however, systems have a tendency to change over time and systems often are retrofitted and the timing changes. In addition there are situations where the details of the latency are not known and the platform is too large to place on a motion table as a system. In these situations, an algorithm is required that will help determine the latency difference between the INS and the IMU.

SUMMARY OF THE INVENTION

In general, a vehicle may comprise a vehicle platform, an antenna, and an antenna positioner configured to position the antenna relative to the vehicle platform. An inertial navigation system (INS) may be associated with the vehicle platform and configured to generate INS output data. An inertial measurement unit (IMU) may be associated with the antenna positioner and configured to generate IMU output data having a timing latency difference relative to the INS output data. A controller may be configured to control the antenna positioner based upon the INS output data and the IMU output data adjusted for the timing latency therebetween.

The controller may be configured to implement a sampling algorithm to adjust for the timing latency. The sampling algorithm may comprise a Fibonacci sequence sampling of the IMU output data. The INS and IMU may be spaced apart on the vehicle platform. A first lowpass filter may be associated with the INS output data, and a second lowpass filter may be associated with the IMU output data. The INS output data may have a greater positioning accuracy than the IMU output data. In another example, the INS output data may have a higher latency than the IMU output data. The INS output data may also have a lower frequency than the IMU output data. In another example, a pointing device may be configured to point a laser relative to the vehicle platform and the controller may be configured to control the pointing device based upon the INS output data and the IMU output data adjusted for the timing latency therebetween.

Another aspect is directed to a method for positioning an antenna for a vehicle that may comprise a vehicle platform, an antenna positioner configured to position an antenna relative to the vehicle platform, and an inertial navigation system (INS) associated with the vehicle platform and configured to generate INS output data. The method may comprise operating an inertial measurement unit (IMU) associated with the antenna positioner to generate IMU output data having a timing latency difference relative to the INS output data, and operating a controller to control the antenna positioner based upon the INS output data and the IMU output data adjusted for the timing latency therebetween.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
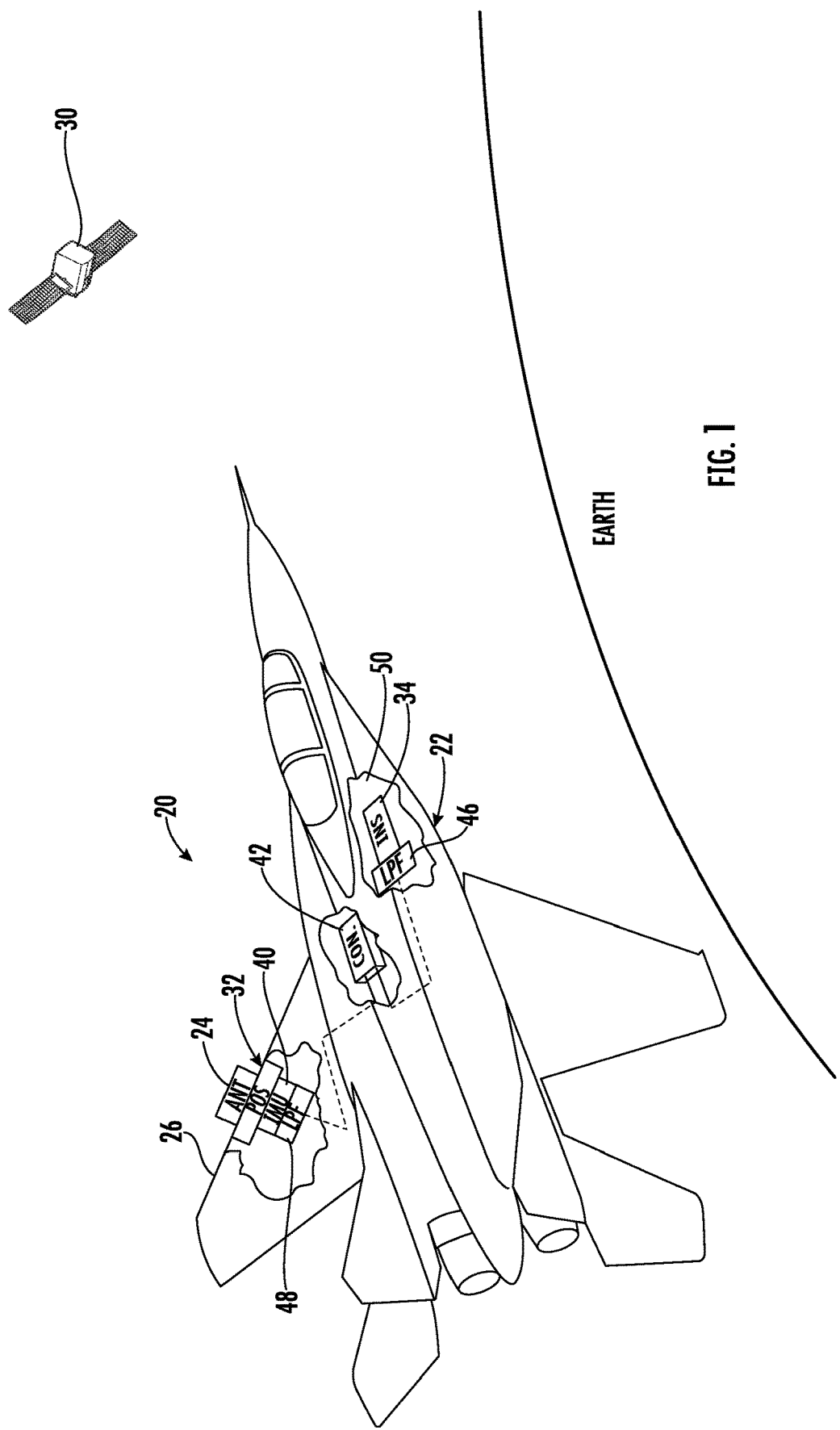
FIG. 1 is an environmental perspective view of a vehicle illustrated as an aircraft having an INS and IMU that are adjusted for timing latency therebetween in accordance with a non-limiting example.

Referring initially to FIG. 1, a vehicle such as an aircraft is illustrated generally at 20, and includes a vehicle platform 22 configured in this example as a jet. The vehicle platform could be any configuration, however, including a ship, drone, or other vehicle platform. An antenna, or laser in another example, is illustrated generally at 24 and is positioned on a wing 26 of the aircraft 20, but could be positioned at different locations on the vehicle platform 22. The antenna 24 may be formed as a phased array antenna, a horn antenna or other antenna that is configured to align accurately with a satellite 30, for example, a ship or other terrestrial device requiring high accuracy, such as a beamwidth of about 1.3 degrees and a pointing error of as little as about 0.2 degrees.

Figure 2:
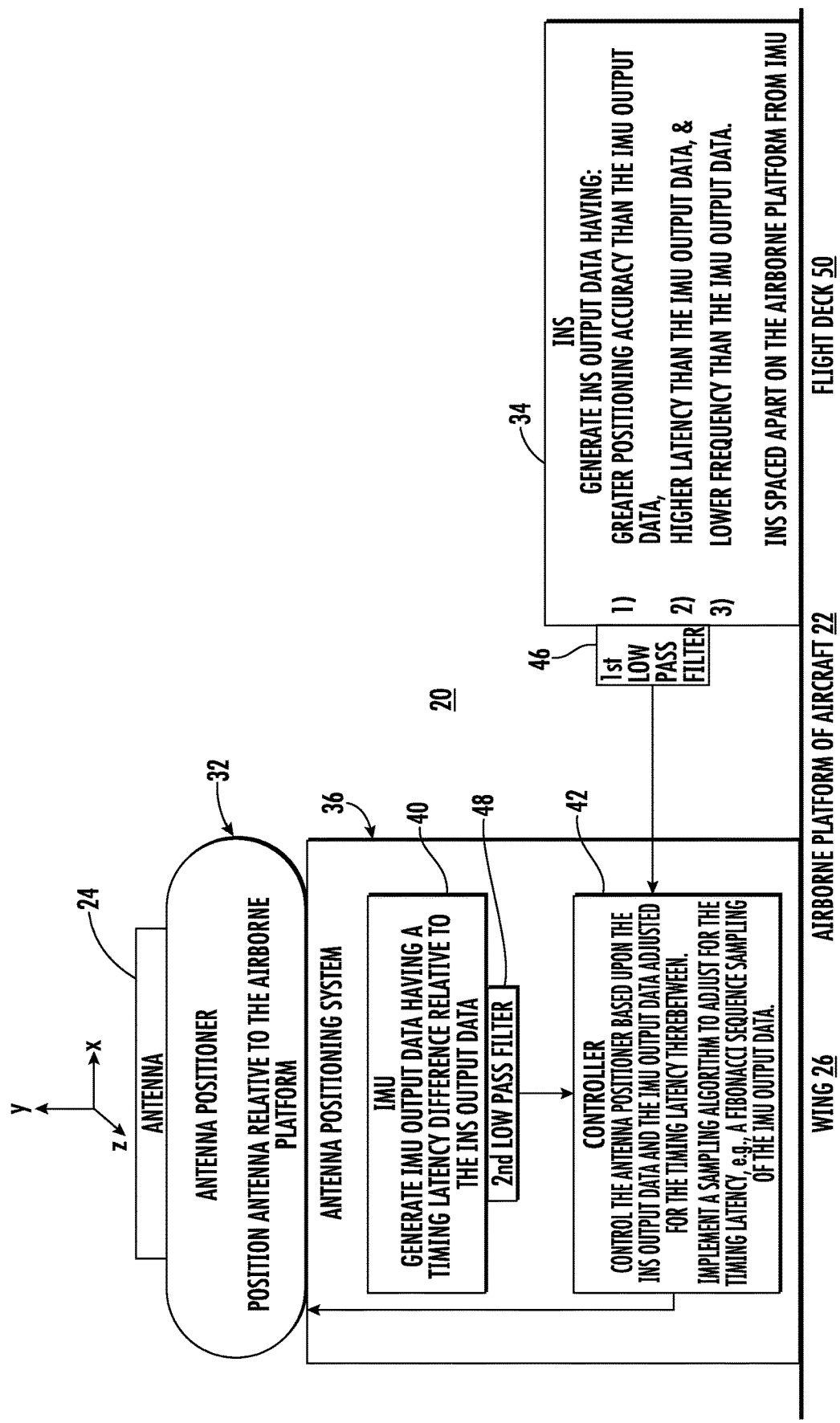
FIG. 2 is a block diagram showing details of the antenna, the antenna positioning system with its IMU and controller and the INS of FIG. 1.

Referring also to the more detailed block diagram of FIG. 2 in this example, an antenna positioner, which could be a pointing device, such as for a laser, is illustrated generally at 32 and is configured to position the antenna 24 relative to the vehicle platform 22. An Inertial Navigation System (INS) 34 is associated with the vehicle platform 22 and configured to generate INS output data. An antenna positioning system 36 includes an Inertial Measurement Unit (IMU) 40 that is associated with the antenna positioner 32 and configured to generate IMU output data having a timing latency difference relative to the INS 34 output data. A controller 42 is coupled to the IMU 40 and integrated in this example with the antenna positioning system 36 and configured to control the antenna positioner 32 based upon the INS output data and the IMU output data adjusted for the timing latency therebetween. It should be understood that the antenna 24 could instead be a laser and the antenna positioning system 36 may operate as a laser pointing system having a laser pointer instead of an antenna positioner 32. Thus, the laser instead of the antenna 24 is pointed via the laser pointer and the controller 42 controls the laser pointer based upon the INS output data and the IMU output data adjusted for the timing latency therebetween.

A first lowpass filter 46 is associated with the INS 34 output data and a second lowpass filter 48 is associated with the IMU 40 output data. In an example, both first and second lowpass filters 46,48 may be integrated with the controller 42 or integrated with the respective INS 34 and IMU 40. Both filters 46,48 may filter out vibration noise, and may filter the INS 34 and IMU 40 output data in the same coordinate time frame with about 30 rad/sec filtering, corresponding to about 5 Hz filtering, and corresponding to a difference equation on both the IMU and INS. The controller 42 is configured to implement a sampling algorithm to adjust for the timing latency, which in an example is a Fibonacci sequence sampling of the IMU 40 output data. This sampling may correspond to multiple residual calculations at Fibonacci intervals in both positive and negative samples. The controller 42 may look for the best residual and move the correlation in a filtering function as a form of moving average, which may be run for roll, pitch, and yaw. Any time updates may be averaged from each measurement of the roll, pitch, and yaw and then correlated.

As shown in both FIGS. 1 and 2, the INS 34 and IMU 40 are spaced apart on the vehicle platform 22. For example, the INS 34 may be positioned in an example of an aircraft having an airborne platform within the flight deck 50 of the aircraft 20 as illustrated, and the IMU 40 may be positioned on a pedestal or gimbal device as part of the antenna positioner 32 located on the wing 26 of the aircraft. The INS 34 output has a greater positioning accuracy than the IMU 40 output data. For example, the INS 34 may include a global positioning system (GPS) circuit and associated components, giving greater accuracy to the INS output data than the IMU 40 output data, which usually is based on data obtained, for example, from an accelerometer and gyroscope without any GPS. The INS 34 output data may have a higher latency than the IMU 40 output data since the INS is positioned in the flight deck 50, for example, at a distance from the antenna 24 on the aircraft wing 26 and the INS sampling is much lower than that of the IMU. The INS 34 output data may have a lower frequency than the IMU 40 output data. In an example, the INS 34 output data may range from about 10 to 500 Hz, as compared to the IMU 40 output data, which may range from about 500 Hz to 4 KHz.

Figure 3:
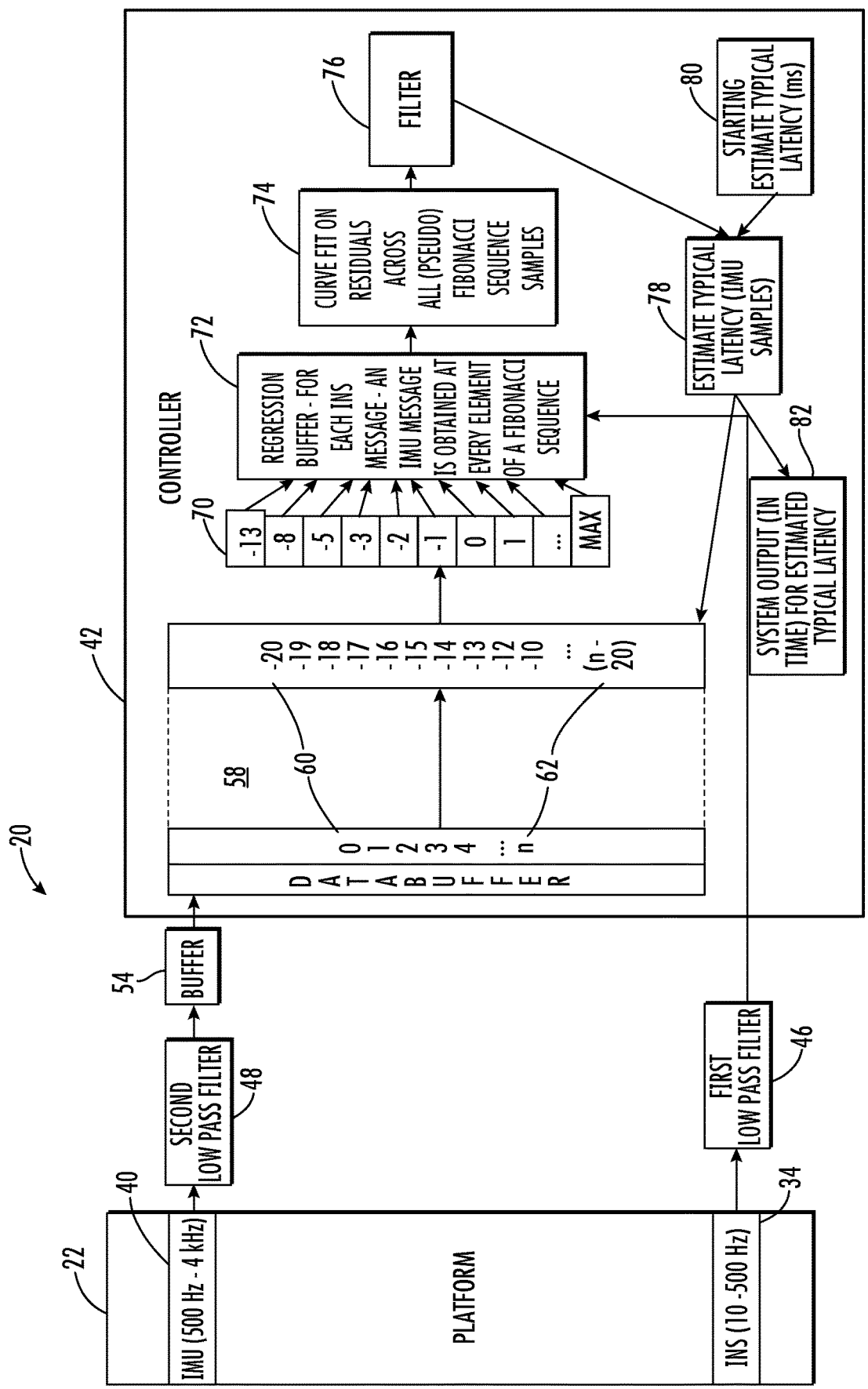
FIG. 3 is a detailed block diagram of the data processing at the controller based upon INS output data and the IMU output data adjusted for the timing latency therebetween.

Referring now to FIG. 3, there is illustrated a more detailed block diagram of the data processing on the IMU 40 output data and INS 34 output data that occurs at the controller 42, including the filtering and sampling at both positive and negative Fibonacci intervals. The vehicle platform 22 supports the INS 34 and IMU 40 in spaced relation from each other. The IMU 40 output data is based upon sampling from about 500 Hz to about 4 KHz, and the INS 34 output data is based upon sampling from about 10 to about 500 Hz. These sampling rates for the IMU 40 and INS 34 are non-limiting examples and can vary depending on the type of vehicle 20, such as the illustrated aircraft, the configuration of the vehicle platform 22, the amount of bending movements that may occur at different segments of the vehicle platform, and terrestrial and airborne conditions, including climate conditions, all which may affect accuracy of the IMU and INS. Because of these factors, the variations and latency and timing differences between the IMU 40 and INS 34 can be significant.

Both the INS 34 output data and the IMU 40 output data are passed through the respective first and second lowpass filters 46,48 that filter out vibration noise. The IMU 40 output data is passed into a buffer 54 that receives and holds this higher speed data before passing into the controller 42. The buffer 54 may operate to control the initial amount of IMU 40 output data passing into the controller 42 for processing. The IMU 40 output data is buffered and sampled at the controller 42 and processed in a first processing unit 58, indicating the most current measurement 60 and oldest stored measurement 62, and the processing unit showing the values from −20 as the most current measurement to n−20 as the oldest stored measurement. This assumes that the typical latency in samples is set to about 20 samples. At a second processing unit 70, multiple residual calculations are processed at Fibonacci intervals in a sequence of samples of both positive and negative interval samples, showing an example at −13 and continuing upward along the Fibonacci sequence to a maximum that can be about 100 as a non-limiting example, but can vary depending on how the controller 42 processes a maximum average latency.

A regression buffer 72 receives the INS 34 output data and the processed IMU 40 output data from the second processing unit 70. Each time an INS 34 data message (packet) of the INS output data is received, an IMU 40 message is obtained at every element of the Fibonacci sequence and followed by an INS data value. A third processing unit 74 processes the merged INS 32 output data and IMU 40 output data and obtains a curve fit on residuals across all Fibonacci sequence samples. Data is output and may be filtered at an optional filter component 76, and a computational estimator unit in the controller 42 receives the filtered data and updates an estimated typical latency for IMU samples 78 that includes a starting point for an estimated typical latency in microseconds 80. This estimated latency in IMU samples 78 is also fed back to the first processing unit 58 where the most current measurement 60 and oldest stored measurements 62 are processed. The system output 82 (in time) is for the estimated typical latency and may be used to match changes in attitude of the INS 34 as determined by measured orientations over time with the IMU 40 and its antenna positioner 32 (or pointing device depending on the specific configuration). For example, it is possible to match the attitude of the IMU 40 with the attitude of the platform INS 34 using the timing correlations as described, and use an estimated rotation rate bias of the IMU and a changing orientation of the INS 34 to compensate for attitude mismatching. The IMU 40 attitude may be slaved to the INS 34 attitude by controlling the IMU 40 and integrating measured body rotation rates over time to match changes in attitude of the INS 34.

Figure 4:
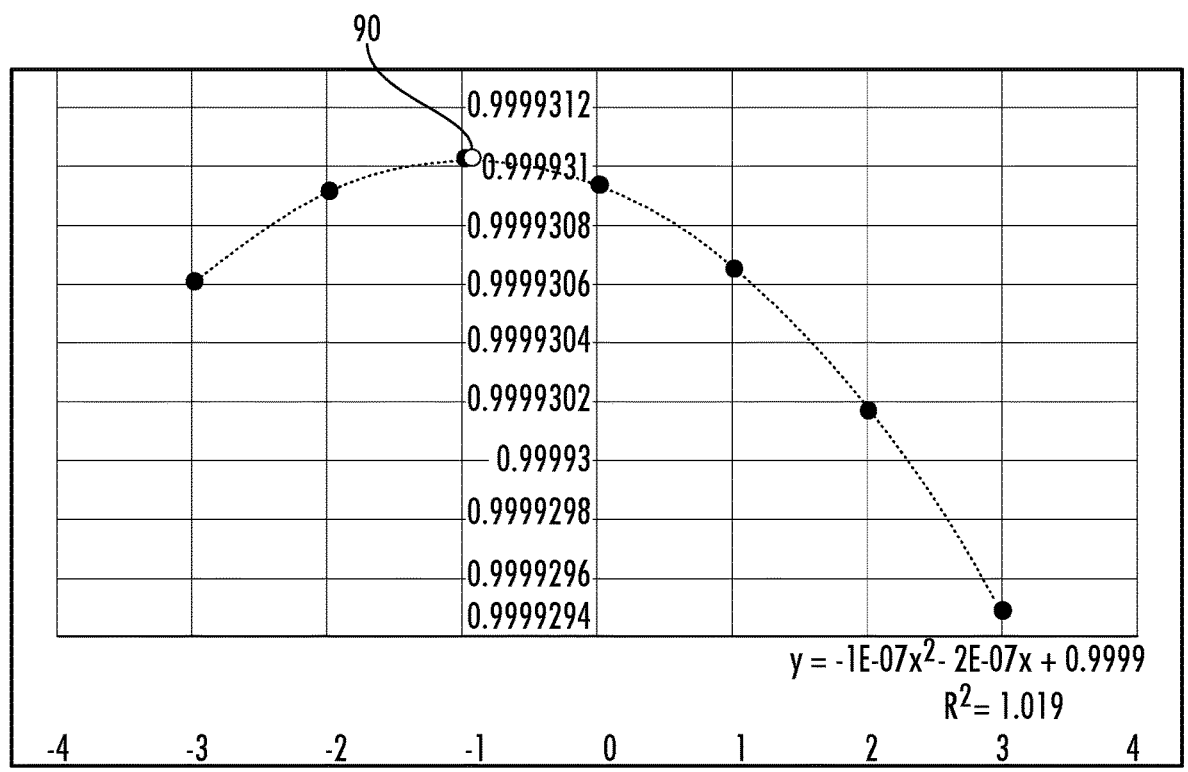
FIG. 4 is a graph showing a curve for estimated samples in an example taken from the data processing of FIG. 3.

Referring now to FIG. 4, there is illustrated a graph of correlated results showing a high latency estimation of −0.943285894 samples indicated at 90 based upon 20 samples, indicating that the current estimate of the typical latency is high, and thus, should have been closer to 19 samples and should be reduced in order to work through a zero typical latency.

The processing at the controller 42 is described relative to a classic Fibonacci sequence, but it is possible to use a modified pseudo Fibonacci sequence. For example, a true Fibonacci sequence as an example includes the sequence 1, 2, 3, 5, 8, 13, 21, 34, 55, and 89. The modified Fibonacci sequence may use 1, 2, 3, 5, 8, 13, 20, 30, 50, and 80 for more simplified data processing at the controller 42, but still maintaining the spread of data that is tight close to zero, but farther away with the more spread sequences. The controller 42 may operate on three data sets corresponding to the roll, pitch, and yaw, and thus, there may be three time estimates that are averaged.

Figure 5:
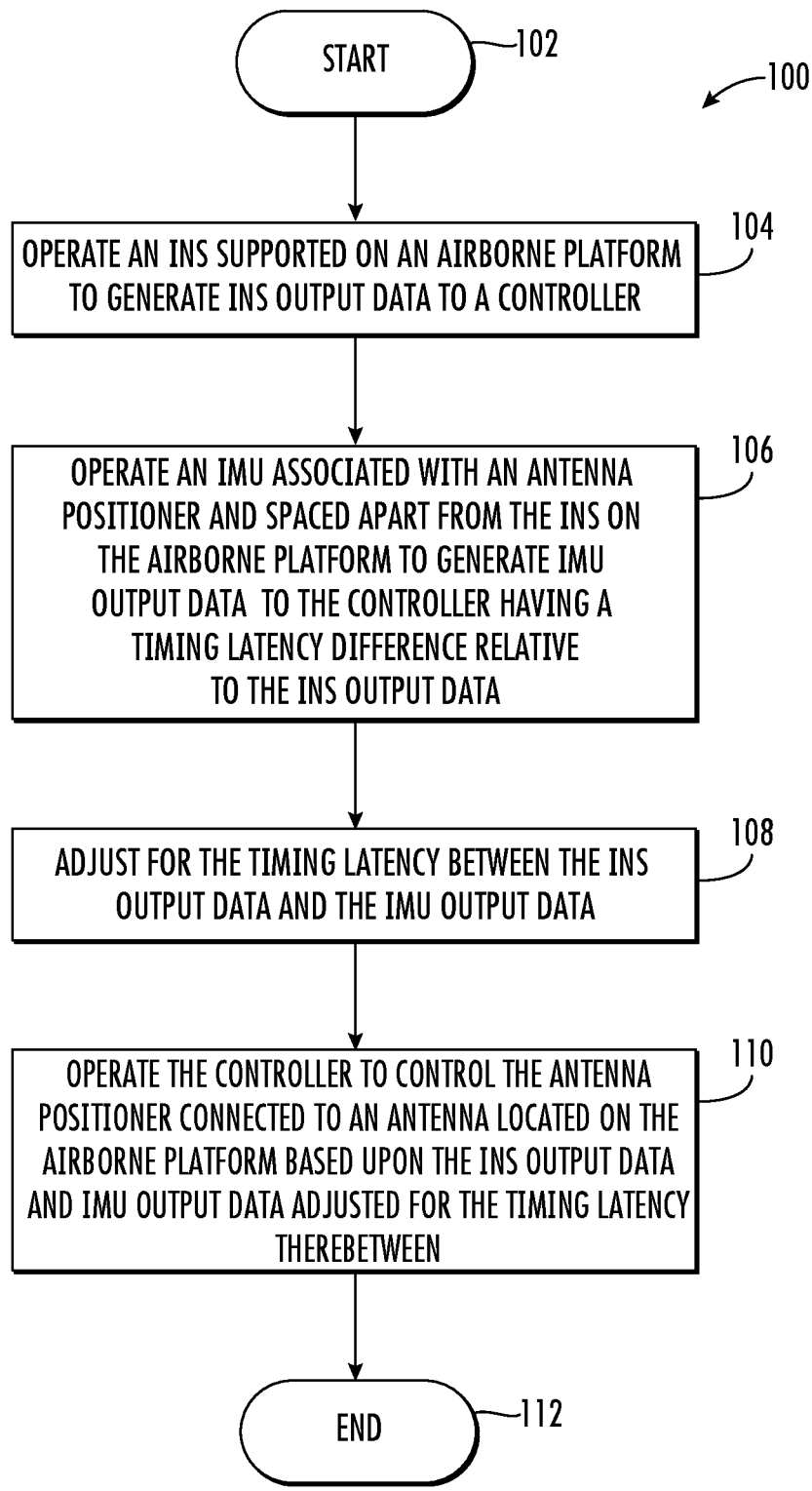
FIG. 5 is a high-level flowchart illustrating the method of positioning the antenna in the antenna positioning system of FIGS. 1 and 2.

Referring now to FIG. 5, a high-level flowchart of a method used for positioning the antenna 24 for the vehicle 20, such as an aircraft, that includes the vehicle platform 22 and the antenna positioner 32 is illustrated generally at 100. The process starts (Block 102) and the INS 34 supported on the vehicle platform 22 is operated to generate an INS output data to the controller 42 (Block 104). The IMU 40 associated with the antenna positioner 32 and spaced apart from the INS 34 on the vehicle platform 22 is operated to generate IMU 40 output data to the controller 42 having a timing latency difference relative to the INS output data (Block 106). The timing latency between the INS 34 output data and the IMU 40 output data is adjusted (Block 108) and the controller 42 operated to control the antenna positioner 32 connected to the antenna 24 located on the vehicle platform 22 based upon the INS output data and the IMU output data as adjusted for the timing latency therebetween (Block 110). The process ends (Block 112).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle comprising:
   a vehicle platform;
   an antenna;
   an antenna positioner configured to position the antenna relative to the vehicle platform when the vehicle is in motion;
   an inertial navigation system (INS) associated with the vehicle platform and configured to generate INS output data when the vehicle is in motion;
   an inertial measurement unit (IMU) associated with the antenna positioner and configured to generate IMU output data when the vehicle is in motion and having a dynamic timing latency difference relative to the INS output data when the vehicle is in motion; and
   a controller configured to control the antenna positioner when the vehicle is in motion based upon the INS output data and the IMU output data adjusted for the dynamic timing latency therebetween.

2. The vehicle of claim 1 wherein the controller is configured to implement a sampling algorithm to adjust for the dynamic timing latency.

3. The vehicle of claim 2 wherein the sampling algorithm comprises a Fibonacci sequence sampling of the IMU output data.

4. The vehicle of claim 1 wherein the INS and IMU are spaced apart on the vehicle platform.

5. The vehicle of claim 1 comprising a first lowpass filter associated with the INS output data.

6. The vehicle of claim 1 comprising a second lowpass filter associated with the IMU output data.

7. The vehicle of claim 1 wherein the INS output data has a greater positioning accuracy than the IMU output data.

8. The vehicle of claim 1 wherein the INS output data has a higher latency than the IMU output data.

9. The vehicle of claim 1 wherein the INS output data has a lower frequency than the IMU output data.

10. An antenna positioning system for a vehicle comprising a vehicle platform, an antenna positioner configured to position an antenna relative to the vehicle platform when the vehicle is in motion, and an inertial navigation system (INS) associated with the vehicle platform and configured to generate INS output data when the vehicle is in motion; the antenna positioning system comprising:
   an inertial measurement unit (IMU) associated with the antenna positioner and configured to generate IMU output data when the vehicle is in motion and having a dynamic timing latency difference relative to the INS output data; and
   a controller configured to control the antenna positioner when the vehicle is in motion based upon the INS output data and the IMU output data adjusted for the dynamic timing latency therebetween.

11. The antenna positioning system of claim 10 wherein the controller is configured to implement a sampling algorithm to adjust for the dynamic timing latency.

12. The antenna positioning system of claim 11 wherein the sampling algorithm comprises a Fibonacci sequence sampling of the IMU output data.

13. The antenna positioning system of claim 10 wherein the INS and IMU are spaced apart on the vehicle platform.

14. The antenna positioning system of claim 10 comprising a first lowpass filter associated with the INS output data.

15. The antenna positioning system of claim 10 comprising a second lowpass filter associated with the IMU output data.

16. The antenna positioning system of claim 10 wherein the INS output data has a greater positioning accuracy than the IMU output data.

17. The antenna positioning system of claim 10 wherein the INS output data has a higher latency than the IMU output data.

18. The antenna positioning system of claim 10 wherein the INS output data has a lower frequency than the IMU output data.

19. A laser pointing system for a vehicle platform comprising a pointing device configured to point a laser relative to the vehicle platform when the vehicle is in motion, and an inertial navigation system (INS) associated with the vehicle platform and configured to generate INS output data when the vehicle is in motion; the laser positioning system comprising:
   an inertial measurement unit (IMU) associated with the pointing device and configured to generate IMU output data when the vehicle is in motion and having a dynamic timing latency difference relative to the INS output data; and
   a controller configured to control the pointing device when the vehicle is in motion based upon the INS output data and the IMU output data adjusted for the dynamic timing latency therebetween.

20. The laser pointing system of claim 19 wherein the controller is configured to implement a sampling algorithm to adjust for the dynamic timing latency.

21. The laser pointing system of claim 20 wherein the sampling algorithm comprises a Fibonacci sequence sampling of the IMU output data.

22. The laser pointing system of claim 19 wherein the INS output data has a greater positioning accuracy than the IMU output data; the INS output data has a higher latency than the IMU output data; and the INS output data has a lower frequency than the IMU output data.

23. A method for positioning an antenna for a vehicle comprising a vehicle platform, an antenna positioner configured to position the antenna relative to the vehicle platform when the vehicle is in motion, and an inertial navigation system (INS) associated with the vehicle platform and configured to generate INS output data when the vehicle is in motion; the method comprising:
   operating an inertial measurement unit (IMU) associated with the antenna positioner to generate IMU output data when the vehicle is in motion and having a dynamic timing latency difference relative to the INS output data; and
   operating a controller to control the antenna positioner when the vehicle is in motion based upon the INS output data and the IMU output data adjusted for the dynamic timing latency therebetween.

24. The method of claim 23 comprising operating the controller to implement a sampling algorithm to adjust for the dynamic timing latency.

25. The method of claim 24 wherein the sampling algorithm comprises a Fibonacci sequence sampling of the IMU output data.

26. The method of claim 23 wherein the INS and IMU are spaced apart on the vehicle platform.

27. The method of claim 23 comprising performing a first lowpass filter operation associated with the INS output data.

28. The method of claim 23 comprising performing a second lowpass filter operation associated with the IMU output data.

29. The method of claim 23 wherein the INS output data has a greater positioning accuracy than the IMU output data; the INS output data has a higher latency than the IMU output data; and the INS output data has a lower frequency than the IMU output data.

* * * * *